US009625307B2

(12) United States Patent
Muramatsu et al.

(10) Patent No.: US 9,625,307 B2
(45) Date of Patent: Apr. 18, 2017

(54) OCCUPANT DETERMINATION APPARATUS

(71) Applicant: HONDA MOTOR CO., LTD., Tokyo (JP)

(72) Inventors: Yusuke Muramatsu, Utsunomiya (JP); Mikihito Kojima, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 488 days.

(21) Appl. No.: 14/211,686

(22) Filed: Mar. 14, 2014

(65) Prior Publication Data
US 2014/0297214 A1   Oct. 2, 2014

(30) Foreign Application Priority Data

Mar. 28, 2013   (JP) ................................ 2013-069262

(51) Int. Cl.
G01G 19/414   (2006.01)
B60R 21/015   (2006.01)
B60N 2/00   (2006.01)

(52) U.S. Cl.
CPC ......... *G01G 19/4142* (2013.01); *B60N 2/002* (2013.01); *B60R 21/0155* (2014.10); *B60R 21/01516* (2014.10)

(58) Field of Classification Search
CPC .......... B60R 21/01516; B60R 21/0155; B60N 2/002; G01G 19/4142
USPC ............... 702/101, 43; 340/667, 426.1, 436; 701/29.6, 45; 180/271, 273, 735
See application file for complete search history.

(56) References Cited

U.S. PATENT DOCUMENTS

| 6,012,007 A * | 1/2000 | Fortune | G06K 9/00362 180/271 |
| 6,650,978 B1 * | 11/2003 | Patterson | B60R 21/01512 180/273 |
| 6,748,814 B2 * | 6/2004 | Ishida | G01G 19/4142 177/136 |
| 6,786,104 B1 * | 9/2004 | Aoki | G01G 19/4142 73/862.472 |
| 6,889,146 B2 * | 5/2005 | Sullivan | B60R 21/0155 702/42 |

(Continued)

FOREIGN PATENT DOCUMENTS

| JP | 10-194076 | 7/1998 |
| JP | 2001-239875 | 9/2001 |

(Continued)

OTHER PUBLICATIONS

Japanese Office Action dated Dec. 16, 2014, Application No. 2013-069262, English translation included, 6 pages.

*Primary Examiner* — Carol S Tsai
(74) *Attorney, Agent, or Firm* — Rankin, Hill & Clark LLP

(57) ABSTRACT

An occupant determination apparatus includes a load sensor that detects weight of an occupant seated on a seat of a vehicle, and a determinator determining the weight of the occupant as one status among a plurality of statuses which is set corresponding to the weight based on the measurement weight measured by the load sensor. In a case where an absolute value of acceleration acting on the vehicle becomes equal to or larger than the threshold value set in advance, the determinator determines the weight of the occupant as one of the status among the plurality of statuses based on the measurement weight measured before it becomes the threshold value.

2 Claims, 9 Drawing Sheets

(56) References Cited

U.S. PATENT DOCUMENTS

| | | | | |
|---|---|---|---|---|
| 7,150,469 | B2 * | 12/2006 | Kim | B60R 21/33 280/735 |
| 7,177,746 | B2 * | 2/2007 | Sakai | B60N 2/002 180/273 |
| 8,296,099 | B2 * | 10/2012 | Ito | B60N 2/002 177/25.11 |
| 8,594,893 | B2 * | 11/2013 | Inayoshi | B60N 2/002 701/45 |
| 2002/0059022 | A1 | 5/2002 | Breed et al. | |
| 2004/0032118 | A1 * | 2/2004 | Kojima | B60R 21/01516 280/735 |
| 2004/0079176 | A1 * | 4/2004 | Sullivan | B60R 21/0155 73/862.391 |
| 2011/0010056 | A1 * | 1/2011 | Inayoshi | B60N 2/002 701/45 |
| 2012/0312604 | A1 * | 12/2012 | Fujii | G01G 19/4142 177/1 |

FOREIGN PATENT DOCUMENTS

| | | |
|---|---|---|
| JP | 2003-315141 | 11/2003 |
| JP | 2005-106624 | 4/2005 |
| JP | 2006-123835 | 5/2006 |
| JP | 2007-055556 | 3/2007 |
| JP | 2007-290560 | 11/2007 |
| JP | 2013-001152 | 1/2013 |

\* cited by examiner

| | | G1 | W1 | | G2 | W2 | |
|---|---|---|---|---|---|---|---|
| EMPTY SEAT | 0 0 0 0 0 | 0 0 | 0 0 0 0 0 | 0 0 | 0 0 0 0 0 0 0 0 0 0 0 |
| CRS | 0 0 0 0 0 | 0 0 | 1 1 1 1 1 | 1 1 | 0 0 0 0 0 0 0 0 0 0 0 |
| ADULT | 1 1 1 1 1 | 1 1 | 0 0 0 0 0 | 0 0 | 1 1 1 1 1 1 1 1 1 1 1 |
| LATERAL G | 0 0 0 0 0 | 1 1 | 1 1 1 1 1 | 0 0 | 0 0 0 0 0 0 0 0 0 0 0 |

| | | | | |
|---|---|---|---|---|
| EMPTY SEAT | 0 0 0 0 0 | 0 0 0 0 0 0 0 | 0 0 | 0 0 0 0 0 0 0 0 0 0 0 |
| CRS | 0 0 0 0 0 | 0 0 0 0 0 0 0 | 0 0 | 0 0 0 0 0 0 0 0 0 0 0 |
| ADULT | 1 1 1 1 1 | 0 0 0 0 0 0 0 | 0 0 | 1 1 1 1 1 1 1 1 1 1 1 |

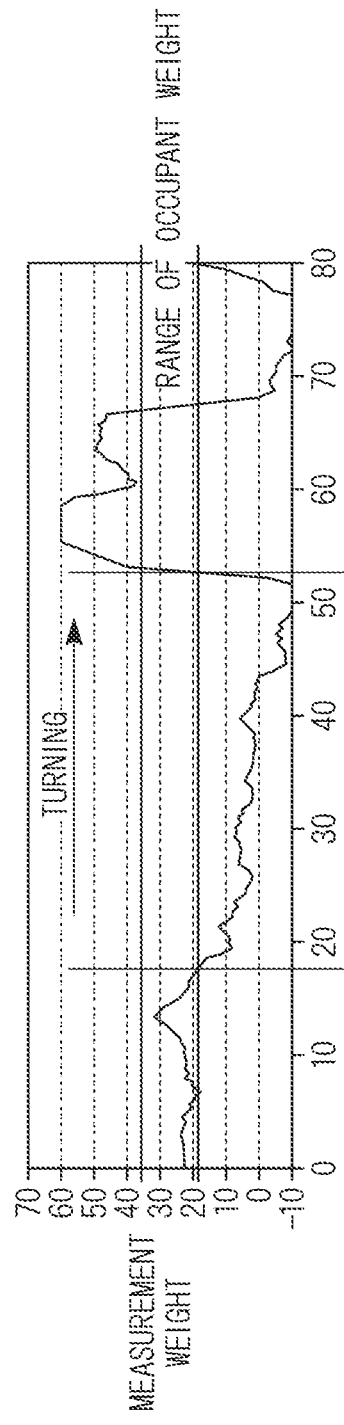
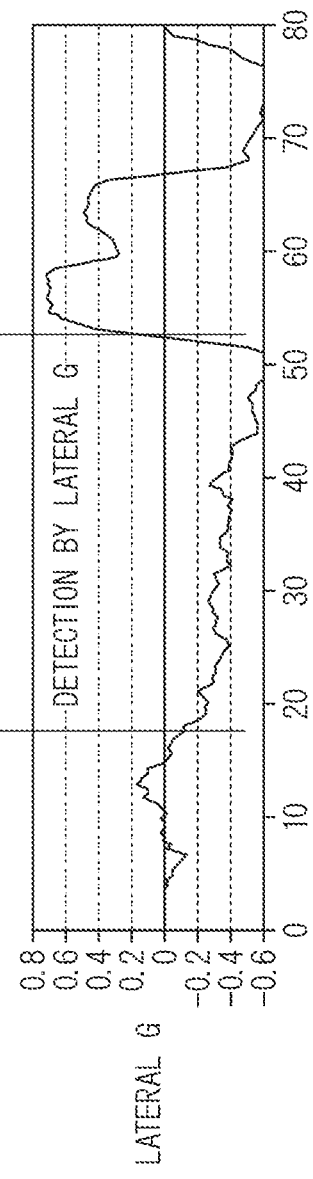
FIG. 7A
FIG. 7B

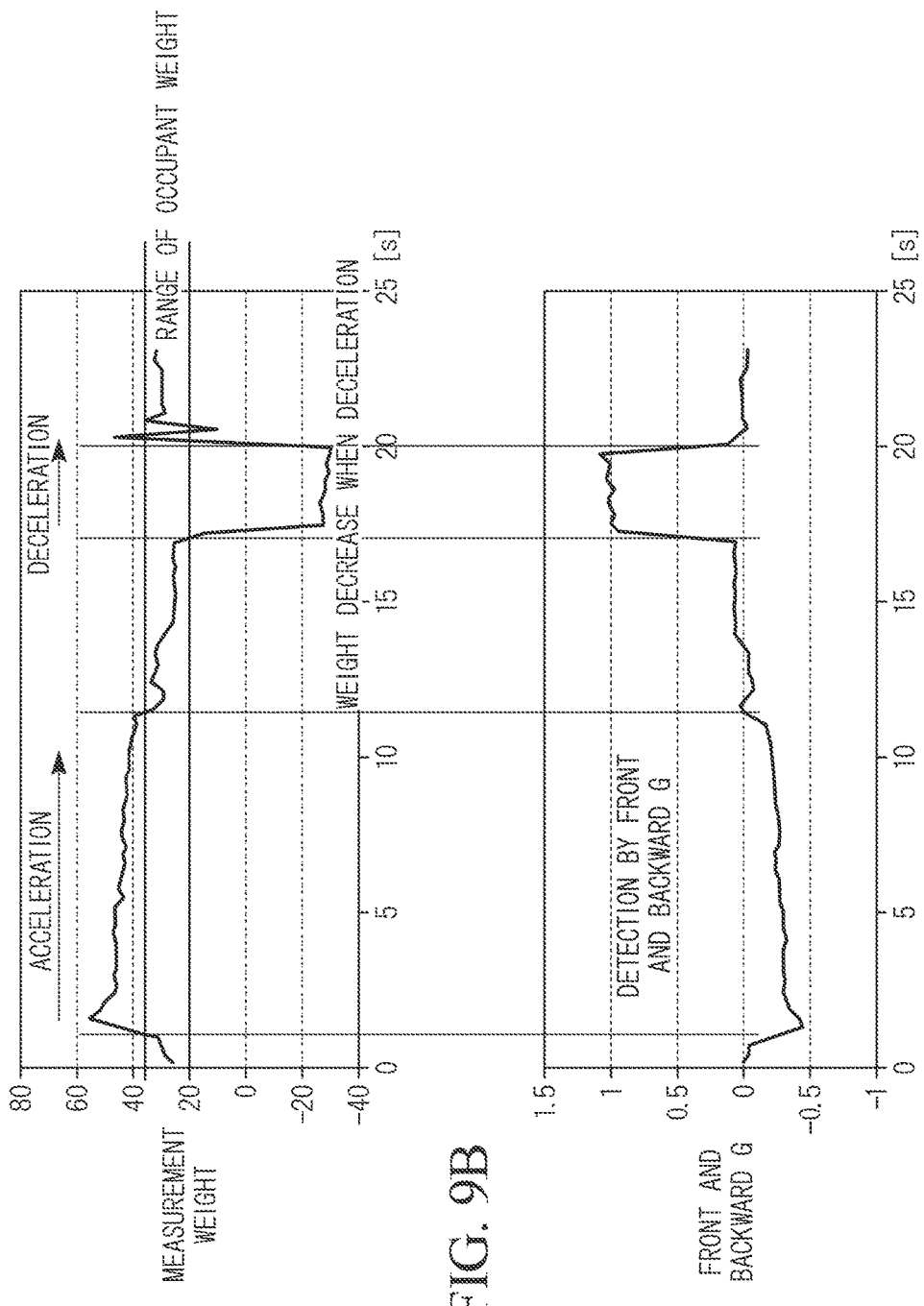

OCCUPANT DETERMINATION APPARATUS

CROSS-REFERENCE TO RELATED APPLICATION

Priority is claimed on Japanese Patent Application No. 2013-069262, filed on Mar. 28, 2013, the content of which is incorporated herein by reference.

BACKGROUND

Field of the Invention

The present invention relates to an occupant determination apparatus in which the weight of an occupant seated on a seat in a vehicle is detected by a load sensor so as to determine any one from a plurality of statuses that are ranges of the weight of the occupant based on the detected measurement weight and acceleration of the vehicle.

Description of Related Art

In the related art, an operation or a non-operation of an air bag system for a front passenger seat of a vehicle, or a deployment speed of the air bag is controlled according to a body size or weight of the occupant seated on the front passenger seat and the presence or absence of the occupant, that is, controlled according to a status. Here, the status is known as four types according to the weight of the occupant: an adult, a child, an infant on a child seat (CRS), an empty seat, or three statuses in which the adult and the child are combined.

The control is performed such that, according to the selected status, for example, in a case where the occupant is the adult or the child, the air bag system operates, and in a case where the occupant is the infant seated on the child seat (CRS) or in a case of the empty seat, the air bag system does not operate.

For example, in the occupant detection device disclosed in Patent Document 1 (Japanese Unexamined Patent Application, First Publication No. 2007-55556), the sum of the load sensors provided on four corners of the seat is determined as weight of the occupant, and the occupant status is determined by comparing the determination threshold value set in advance and the weight of the occupant. In a case where the acceleration of the vehicle is high, the erroneous determination due to the weight shift of the occupant at the time of turning can be prevented by correcting the determination threshold value according to the acceleration or maintaining the determination value up to the previous determination.

In an occupant physique detection device disclosed in Patent Document 2 (Japanese Unexamined Patent Application, First Publication No. 2003-315141), when determining the status by the weight of the occupant, in a case where the number of statuses selected per each unit time, that is, instantaneous status is equal to or more than a predetermined number in a definite time set so as to be longer than the unit time, then the instantaneous status is determined as a final status, so as not to be influenced by the acceleration of the vehicle.

Incidentally, in the vehicle, there is a correlation between a measurement load of the occupant on the front passenger seat and the acceleration of the vehicle. However, the correlation is not the relation of 1:1, but the measured value of the measurement load changes with a delay to a change in acceleration.

For example, as illustrated in FIG. 6, in a case where two load sensors 101 are installed at the front and back of the right side that is one side of a seat 100 in a lateral direction, since an inertial migration of the occupant is generated due to a vehicle movement when the vehicle is turning, the load measured by the load sensor 101 decreases when the vehicle turns left, and increases when turns right. At that time, the weight measured by the load sensor 101 is as illustrated in FIG. 7A, and the acceleration in the lateral direction (referred to as lateral G) measured by an acceleration sensor is as illustrated in FIG. 7B.

As illustrated in FIG. 8, in a case where two load sensors 101 are installed at the back side in a longitudinal direction of the seat 100 (back rest side), the load measured by the load sensors 101 increase when the vehicle is accelerated, and decrease when decelerated due to the inertial migration of the occupant. At that time, the weight measured by the load sensors 101 is as illustrated in FIG. 9A, and the acceleration in the lateral direction (referred to as lateral G) measured by an acceleration sensor is as illustrated in FIG. 9B.

SUMMARY

Incidentally, in the occupant determination device disclosed in Patent Document 1 described above, when the occupant seated on the seat swings right and left or back and forth due to the inertial migration caused by the vehicle movement, a time lag is generated. Therefore, in a case where the threshold value is immediately corrected with respect to the changes in the acceleration, the threshold value changes before the change of the measurement weight is generated, and thus there has been a risk of an erroneous determination.

In the occupant determination device disclosed in Patent Document 2, since the status is finally determined by the number of determinations of the instantaneous status in the definite time, the erroneous determination with respect to the instantaneous acceleration is not occurred. However, in a case where a state (out of position) that the number of installed load sensors 101 is small or a local load applied to one load sensor continues for a long time, there has been a possibility of the erroneous determination that the status is determined with respect to the summed value of all the load sensors 101.

Aspects according to the present invention is made in consideration of the aforementioned problem, and an object of the present invention is to provide an occupant determination apparatus in which the possibility of the erroneous determination is decreased and the correct determination can be performed even in a case where the acceleration is changed or the local load is applied to a specific load sensor for a long time.

An aspect according to the present invention includes the following measures for achieving the object related to solving the problem.

(1) An occupant determination device according to an aspect of the present invention includes a load sensor that detects weight of an occupant seated on a seat of a vehicle, and a determinator determining the weight of the occupant as one status among a plurality of statuses which are set corresponding to the weight based on the measurement weight measured by the load sensor. In a case where an absolute value of acceleration acting on the vehicle becomes equal to or larger than the threshold value set in advance, the determinator determines the weight of the occupant as one status among the plurality of statuses based on the measurement weight measured before the weight becomes the threshold value.

In a case where the absolute value of the acceleration acting on the vehicle becomes equal to or larger than the threshold value set in advance, there is a risk of erroneous determination in selection of the status based on the measurement weight measured by the load sensor influenced by the acceleration due to the right and left turning or acceleration and deceleration in the front and backward direction. However, according to the aspect of (1), by determining one status among the plurality of statuses based on the measurement weight measured before the weight becomes the threshold value, it is possible to prevent the erroneous determination and perform the correct determination.

(2) In the aspect of (1), after the absolute value of the acceleration is in a state of being smaller than the threshold value from a state of being equal to or larger than the threshold value, the determinator may invalidate the determination of the status based on the measurement weight during a predetermined time.

There is a time lag between the changes in acceleration of the vehicle and the changes in the measurement weight of the occupant by the load sensor. According to the aspect of (2), in a case where the absolute value of the acceleration is smaller than the threshold value, by invalidating the determination of the status performed by the selection of the status corresponding to the measurement weight of the occupant during a predetermined time which is the time lag, it is possible to perform the determination of the status based on the measurement weight of the occupant with removing the risk of the erroneous determination due to the time lag.

(3) In the aspect of (2), the determinator may determine the weight of the occupant as one instantaneous status among the plurality of statuses, based on the measurement weight measured per each unit time, and in a case where the number of the instantaneous statuses in a definite time set so as to be longer than the unit time is more than a predetermined number, the determinator may determine the determined instantaneous status as a status in the definite time and may not select the invalidated determination of the status as the instantaneous status.

In the aspect of (3), one status among the plurality of statuses based on the measurement weight per each unit time is selected as the instantaneous status, and in a case where the number of the same instantaneous statuses selected in the definite time is more than the predetermined number set in advance, the instantaneous status is determined as the status in the definite time. However, according to the aspect of (3), by determining the status in the definite time without including the determination of the instantaneous status during the invalidation time into the instantaneous status in the definite time, it is possible to determine the status of the occupant with a high accuracy with excluding the instantaneous status corresponding to the measurement weight which has a possibility of the erroneous determination in a case where the absolute value of the acceleration is equal to or larger than the threshold value.

(4) In any one of the aspects (1) to (3), the determinator may further include: a basic determinator determining the weight of the occupant as one instantaneous status among the plurality of statuses, based on the measurement weight measured per each unit time, and determining the determined instantaneous status as one status among the plurality of statuses in a case where the number of the instantaneous statuses in a definite time set so as to be longer than the unit time is more than a predetermined number; an invalidation determinator invalidating the selection of the instantaneous status corresponding to the measurement weight in the time after the absolute value of the acceleration acting on the vehicle becomes equal to or larger than the threshold value set in advance, and continuing the invalidation of the determination of the instantaneous status from the measurement weight for a predetermined time in a case where the absolute value of the acceleration is smaller than the threshold value; and a definite determinator determining the determined instantaneous status as one status among the plurality of statuses, in a case where the number of the determined instantaneous statuses is more than the predetermined number other than the invalidated selection of the instantaneous status from the status in the definite time set so as to be longer than the unit time.

In the aspect of (4), basically, in a case where the number of one instantaneous status selected by the basic determinator in the definite time is more than the predetermined number, the instantaneous status is determined as a status in the definite time selected from the plurality of statuses. The selection of the instantaneous status after the absolute value of the acceleration of the vehicle is equal to or larger than the threshold value and the selection of the instantaneous status in the predetermined time after the acceleration is smaller than the threshold value again, are invalidate by the invalidation determinator. For this reason, in the definite determinator, when the number of determined specific instantaneous statuses is equal to or more than the predetermined number in the definite time other than the invalidated selection of the instantaneous status, the determined specific instantaneous status is determined as the status selected from the plurality of statuses. Therefore, according to the aspect of (4), the determination of the status of high risk of erroneous determination due to the acceleration can be removed.

According to the aspects, in a case where an absolute value of acceleration of a vehicle exceeds a threshold value, a determination of a status corresponding to a measurement of weight of an occupant per each unit time is invalidated, and the status is determined by a measurement weight measured before the absolute value of the acceleration exceeds the threshold value. Therefore, it is possible to perform the correct determination of the occupant with removing the data having a risk of erroneous operation due to a change of acceleration.

BRIEF DESCRIPTION OF THE DRAWINGS

FIG. 7A is a graph illustrating measured data (measurement weight and a range of weight of the occupant) obtained by the load sensor illustrated in FIG. 6 and the acceleration sensor when the vehicle turns.

FIG. 7B is a graph illustrating measured data (changes of the lateral acceleration) obtained by the load sensor illustrated in FIG. 6 and the acceleration sensor when the vehicle turns.

FIG. 9A is a graph illustrating measured data (measurement weight and a range of weight of the occupant) obtained by the load sensor illustrated in FIG. 8 and the acceleration sensor when the vehicle accelerates and decelerates.

FIG. 9B is a graph illustrating measured data (changes of the lateral acceleration) obtained by the load sensor illustrated in FIG. 8 and the acceleration sensor when the vehicle accelerates and decelerates.

DESCRIPTION OF THE EMBODIMENT

Hereinafter, an occupant determination apparatus according to an embodiment of the present invention will be described based on FIG. 1 to FIG. 5. In the description, unless otherwise stated specifically, up and down means the vertical direction with respect to the vehicle and front and back means the direction of the vehicle traveling back and forth.

Figure 1:
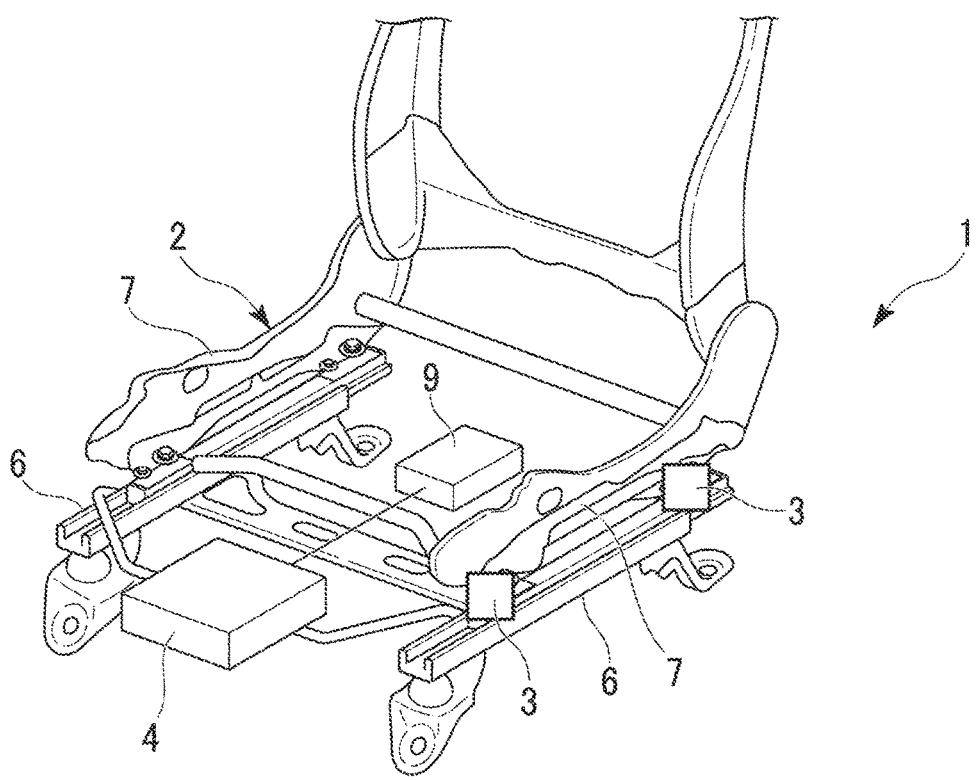
FIG. 1 is a perspective view illustrating a configuration of an occupant determination apparatus provided on the seat according to an embodiment of the present invention.

FIG. 1 illustrates a structure of the occupant determination apparatus 1 in the embodiment of the present invention, for example, in which load sensors 3 and an acceleration sensor 4 are mounted on a framework of the front occupant seat 2 of the vehicle. In the seat 2, a pair of right and left seat rails 6 are fixed on the floor of the vehicle, and a pair of base members 7 are installed thereon so as to be movable front and backward. Then, a pair of load sensors 3 made from load cells is mounted on the position of both ends in the front and backward direction of the base member 7 in one side, for example, in the left side.

The acceleration sensor 4 that measures a three-dimensional acceleration occurring at the time of the acceleration, the deceleration, or the turning of the vehicle is mounted on the base member 7 or on the seat rail 6 of the seat 2. Furthermore, the load sensors 3 and the acceleration sensor 4 are electrically connected to an electronic control unit 9 that determines the status of the occupant seated on the seat 2 when the vehicle travels. Here, the status in the present embodiment is the state that is determined to be corresponding to any of the three types of status: "adult (adult)", "seated on a child seat (CRS)", and "empty seat (empty)" according to the measurement weight of the occupant.

Figure 2:
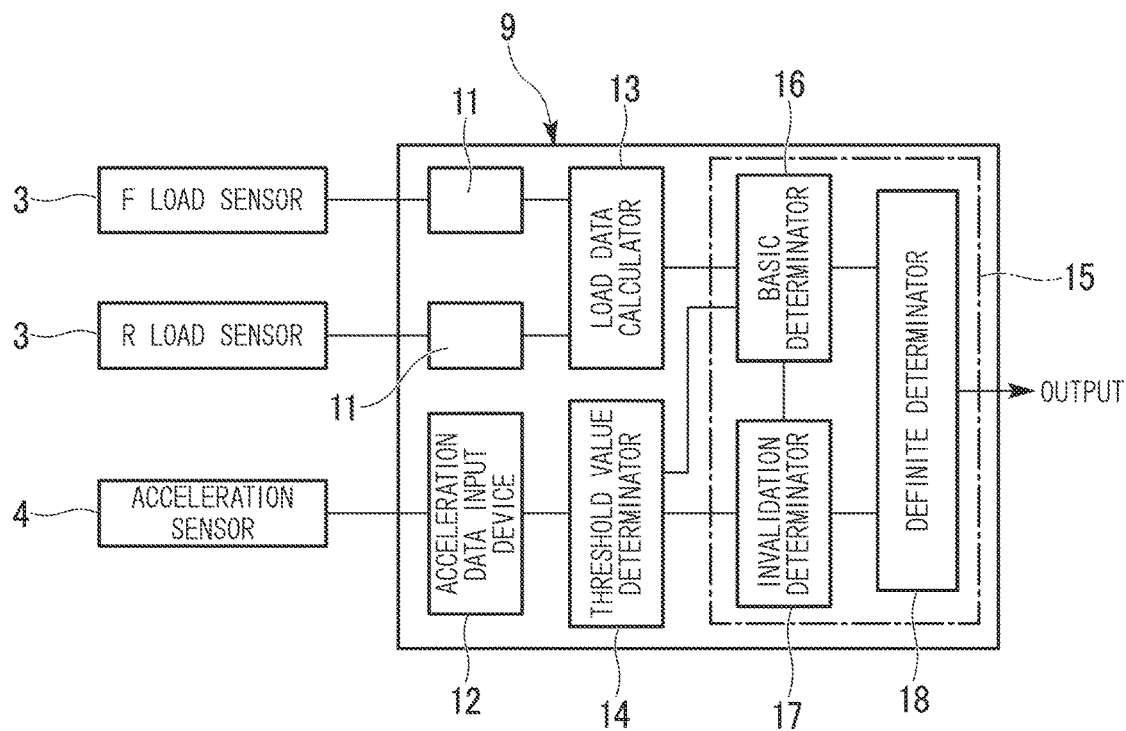
FIG. 2 is a block diagram illustrating an example of an electronic control unit that includes a determinator in the occupant determination apparatus.

A block diagram of a configuration example of the electronic control unit 9 is illustrated in FIG. 2. The electronic control unit 9 in FIG. 2 includes a pair of load data input devices 11 that input the load data measured by the load sensors 3, an acceleration data input device 12 that inputs the lateral acceleration data measured by the acceleration sensor 4, and a load data calculator 13 that calculates the summed value from the load data input from the load data input devices 11. The electronic control unit 9 in FIG. 2 further includes a threshold value determinator 14 that determines whether or not the lateral acceleration data exceeds a threshold value set in advance by an experiment or the like, and a determinator 15 that determines any of the status among the plurality of statuses, for example, the adult, the CRS, or the empty, from the summed value of the load data for each unit time according to the output from the threshold value determinator 14. The unit time can be set to an appropriate number, and is set to 0.5 second here.

The determinator 15 includes: a basic determinator 16 that determines any of the status from the summed value of the load data per unit time among the plurality of three types of statuses, for example, the adult, the CRS, or the empty seat; an invalidation determinator 17 that invalidates the status determination per a unit time with respect to the status determined by the basic determinator 16 based on whether or not the acceleration data exceeds the threshold value determined by the threshold value determinator 14; and a definite determinator 18 that, in a case where the status is invalidated by the invalidation determinator 17, determines a final status in the definite time from the number of status information determined retroactive to previous time excluding the invalidated status information, that is, from the proportion of instantaneous status information in the definite time (for example, a time set to unit time×10) that is longer than the unit time.

Next, the processing of the determinator 15 will be described in detail with reference to FIGS. 3 and 4.

Figure 3:
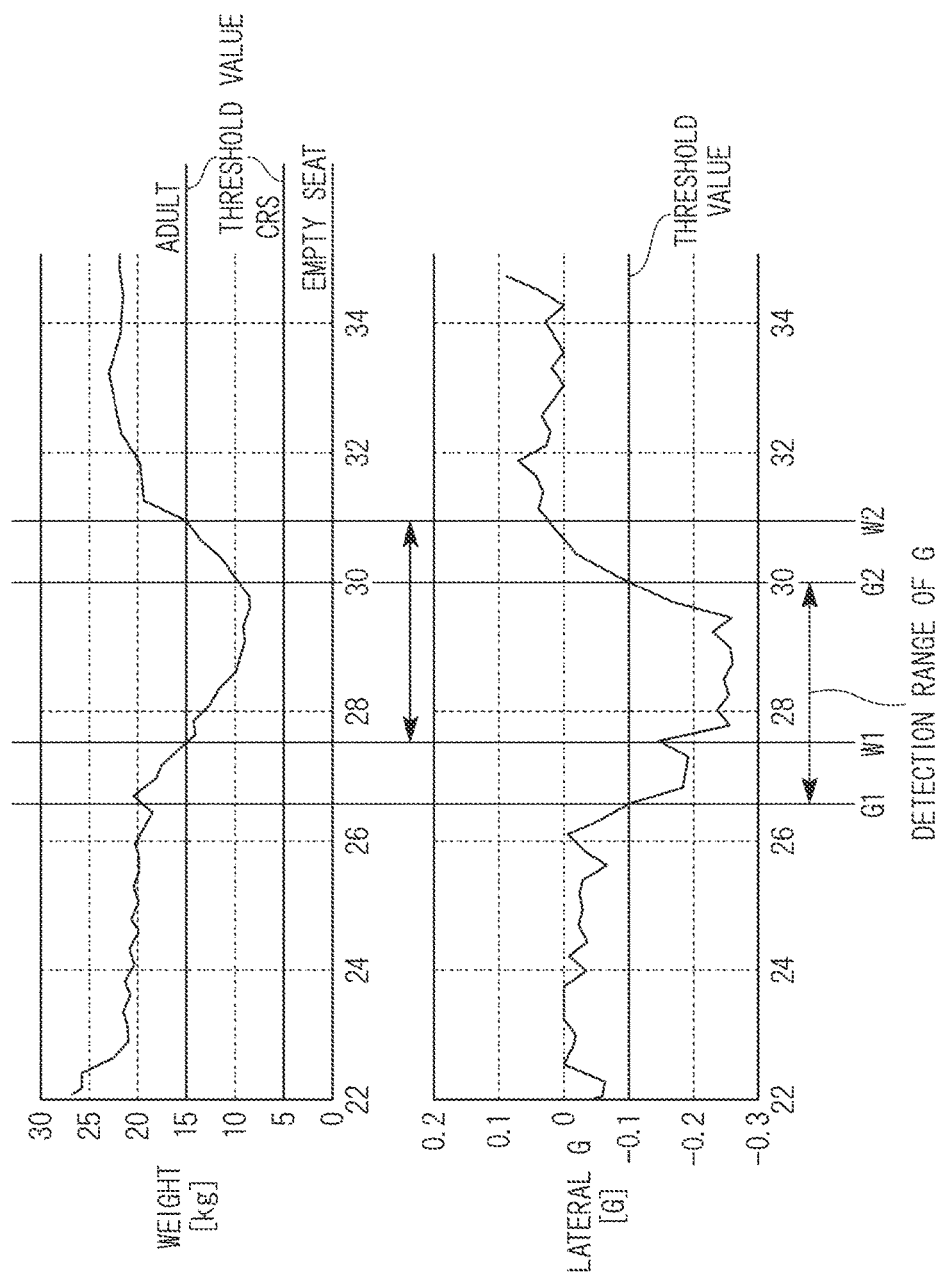
FIG. 3 is a diagram illustrating a change of weight measured by a load sensor illustrated in FIG. 1 and a lateral acceleration by an acceleration sensor.

The upper graph in FIG. 3 illustrates the summed value of the measurement weight of the occupant measured by the load sensors 3 when the vehicle is traveling, and illustrates the changes in measurement weight influenced by the acceleration of the vehicle. In the graph in FIG. 3, the threshold values that determines any one of the three statuses; the adult including the child, the infant (CRS), and the empty seat regarding the measurement weight are set in advance. The threshold values in this case, are 20 kg between the adult and the CRS for example, and 5 kg between the CRS and the empty seat.

Figure 4A:
FIG. 4A is a status table (a table that individually illustrates a determination result of the status selected based on the measurement weight corresponding to a unit time and a determination result in a case where the acceleration exceeds the threshold value and does not exceed the threshold value) that illustrates a determination result when one status is selected from three statuses that correspond to the changes of the measurement weight and the lateral acceleration illustrated in FIG. 3.

In the basic determinator 16, with respect to the measurement weight per unit time, the determination result which determines that the occupant status is corresponding to which of the three types divided by each threshold value is assumed to be the instantaneous status. In the basic determinator 16, the upper status table in FIG. 4A illustrates the status determined as the instantaneous status per unit time based on the sum of the measurement weight measured by the load sensors 3.

Regarding the measurement weight, the occupant may be determined in four types of status by setting a threshold value between the adult and the child.

On the other hand, the lower graph in FIG. 3 illustrates the lateral acceleration (lateral G) due to the right and left turning and the acceleration and deceleration of the vehicle measured by the acceleration sensor 4 when the vehicle is traveling. Then, the threshold value determinator 14 determines whether or not the lateral acceleration data exceeds the threshold value of the lateral acceleration set in advance (a predetermined acceleration), in this example, −0.1 G. In the graph of the lateral G in lower table in FIG. 4A, when the vehicle is traveling, the determination result whether the lateral acceleration of the vehicle measured by the acceleration sensor 4 is larger or smaller than the threshold value set in advance, is illustrated as 1 and 0.

For this reason, in the basic determinator 16, any one of the three statuses is determined by the measurement weight of the occupant per unit time, and the selected status per unit time is assumed to be the instantaneous status. Then, when the determination result of the instantaneous status determined by the basic determinator 16 is discriminated by 1 and 0, the discrimination result is as illustrated in FIG. 4A.

On the other hand, the determination result determined by the threshold value determinator 14 whether the lateral acceleration measured by the acceleration sensor 4 exceeds the threshold value (the predetermined acceleration) or not (whether the lateral acceleration is larger or smaller than the threshold value) is similarly illustrated as 1 and 0 in FIG. 4A.

As can be understood by the graphs in FIG. 3, the measurement weight illustrated in the upper graph and the lateral acceleration G illustrated in the lower graph have a co-relationship, but have a predetermined time lag. The graphs in FIG. 3 have characteristics that the measurement weight's exceeding of the threshold value has an approximately one second delay with respect to the lateral acceleration's exceeding of the threshold value, for example.

For this reason, in the present embodiment, as illustrated in FIG. 3, in a case where the lateral acceleration becomes large to exceed the threshold value, the measurement weight exceeds the threshold value with the delay in one second, and then the status changes to "CRS" from "adult". In a case where the lateral acceleration becomes small to further exceed the threshold value, it can be said that the measurement weight exceeds the threshold value with the delay in one second, and then, the status changes to "adult" from "CRS".

For this reason, if the status of the measurement weight is determined at the same time when the lateral acceleration exceeds the threshold value, there is a high probability of erroneous determination. Therefore, it can be said that it is necessary to determinate the status with a time lag in a predetermined time t, for example, t=one second.

In the determinator 15 in the present embodiment, in a case where the lateral acceleration becomes larger than the threshold value, that is, when the measurement weight begins to change, the determination of the status is controlled to be stopped (invalidated) by the invalidation determinator 17 continuously for the predetermined time set in advance, including the time lag. In a case where the lateral acceleration becomes equal to or smaller than the threshold value, that is, when the measurement weight ends to change, the determination of the status is controlled to be stopped (invalidated) for one second which is the time lag.

In the definite determinator 18, a definite time t2 which is longer than the unit time t1 (for example, t2=t1×10) is set in advance, in the time t2, the number of the same instantaneous statuses in the time duration of unit time×predetermined time (for example, t1×10) is equal to or more than the predetermined number, for example, equal to or more than seven in the adult and the CRS, and equal to more than five in the empty seat, then the instantaneous status is assumed to be the final status in the definite time.

With this processing being the basis, in a case where the determination of the instantaneous status is invalidated by the invalidation determinator 17 through the time of unit time×predetermined time, the final status is determined by the number of instantaneous statuses in the definite time earlier than the determination time by excluding (invalidating) the instantaneous status per unit time of which the number is invalidated determined by the invalidation determinator 17. In a case where the lateral acceleration becomes equal to or smaller than the threshold value, the determination of the instantaneous status in the time t of the time lag is invalidated and the time t is excluded from the definite time.

Figure 5:
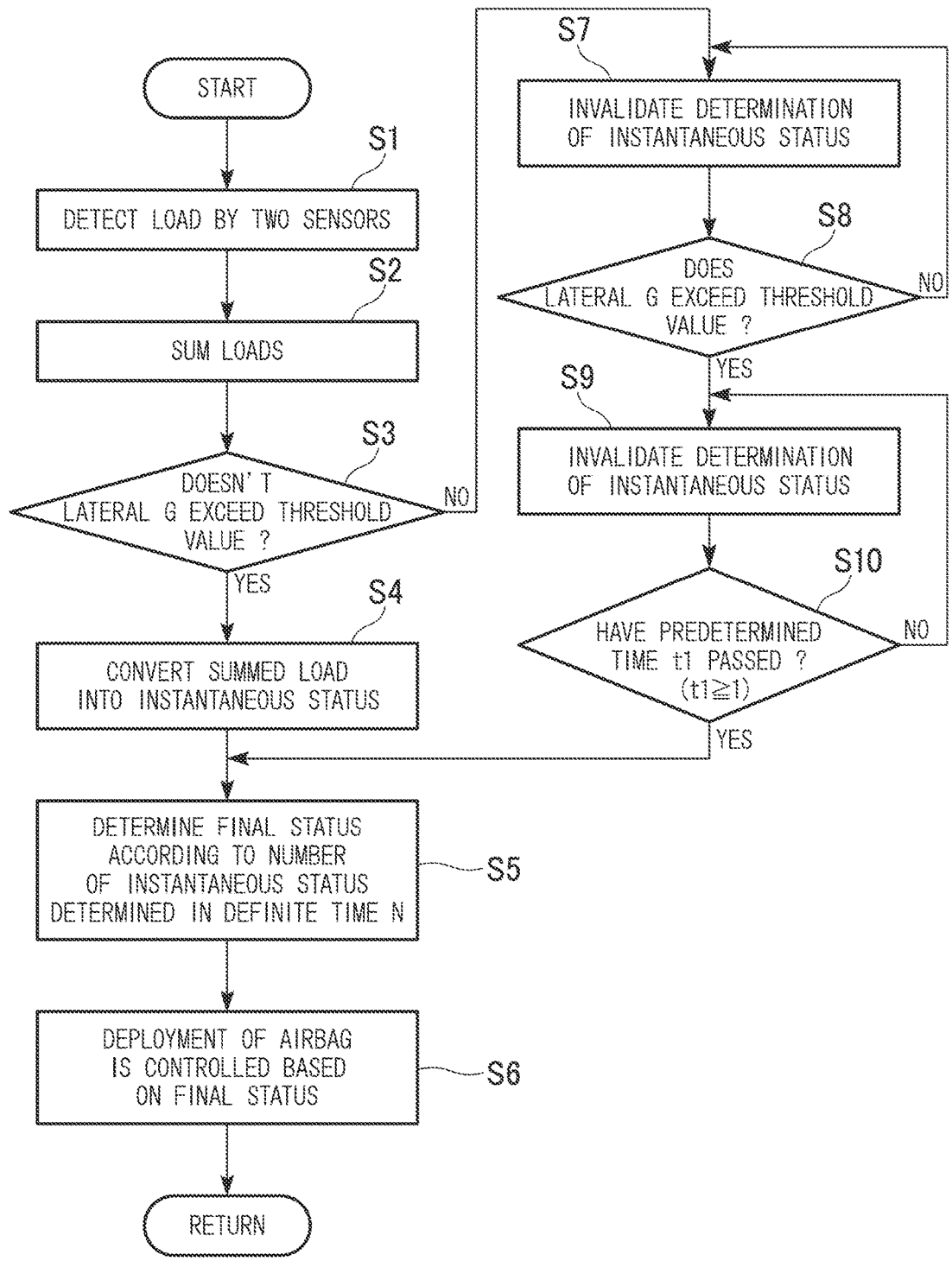
FIG. 5 is a diagram illustrating a flow chart of a determination method by the determinator of the occupant determination apparatus.
Figure 6:
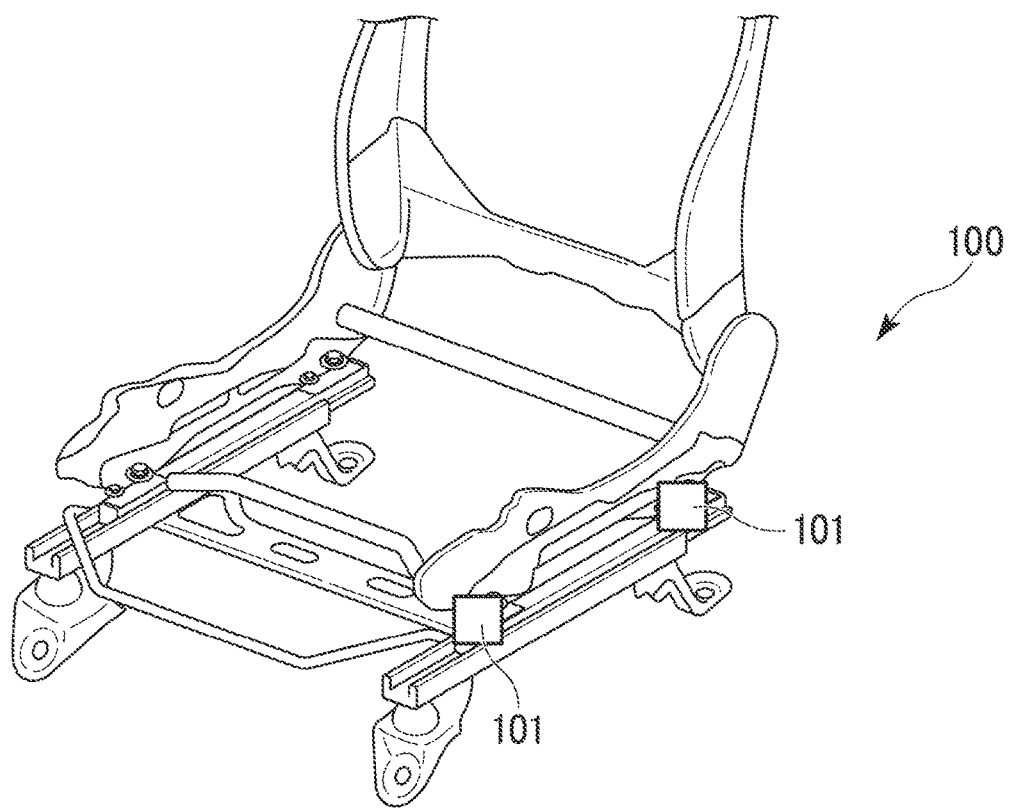
FIG. 6 is a diagram illustrating an arrangement configuration of the load sensor provided on the seat in the related art.
Figure 8:
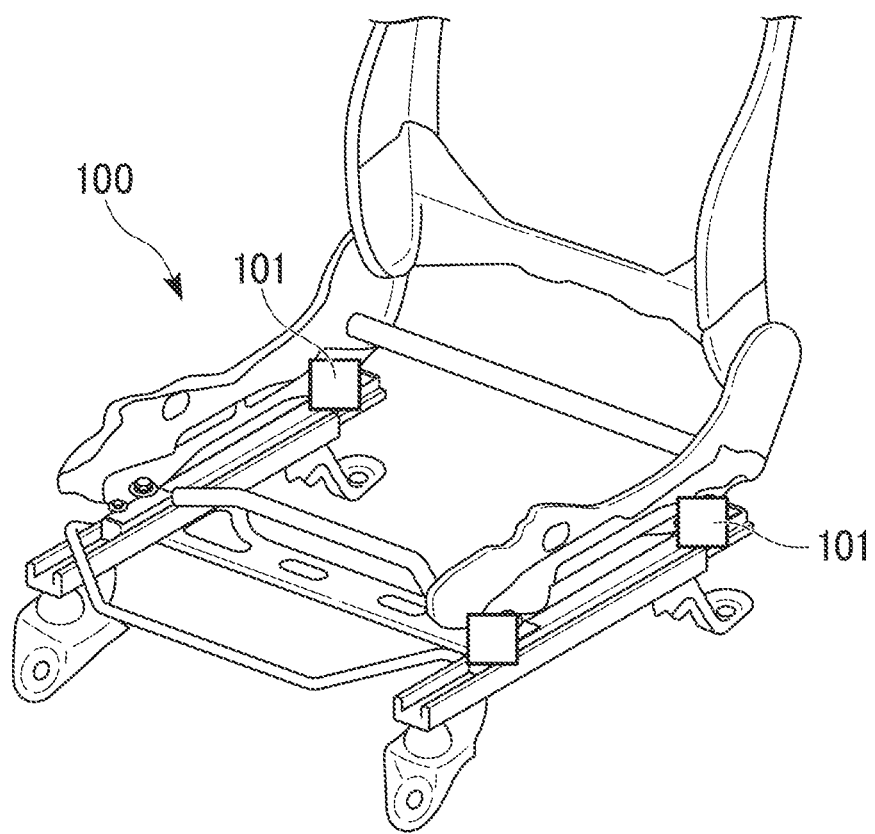
FIG. 8 is a diagram illustrating an arrangement configuration of the load sensor provided on the seat in the related art.

Next, the processing of the determination of the occupant performed by the electronic control unit 9 will be described along with the flowchart illustrated in FIG. 5.

First, when the vehicle is traveling, the load of the occupant is detected by each of the two load sensors 3 provided at one side of the seat 2 in the front and backward direction (STEP S1). Each of the load sensors 3 performs the measurement per each unit time t1 (for example, 0.5 second). The values measured by each of the load sensors 3 and the acceleration sensor 4 are changed as illustrated in FIG. 3 by the influences of the posture of the occupant seated on the seat 2, the front and backward acceleration due to the acceleration and the deceleration, the right-left acceleration due to the turning, and the up-down acceleration due to the unevenness of the road surface.

Next, the values measured by each of the load sensors 3 are input to the load data input devices 11 in the electronic control unit 9, and the load data calculator 13 calculates the sum of each load data (STEP S2). Then, as illustrated in the graph in FIG. 3, the threshold value determinator 14 determines whether or not the lateral acceleration exceeds the threshold value (for example, −0.1 G) (STEP S3). Then, in a case where the lateral acceleration does not exceed the threshold value, the basic determination processing is performed.

That is, in the basic determinator 16 of the determinator 15, the instantaneous status is determined from the summed value of each measurement weights measured by each of the load sensors 3 and calculated by the load data calculator 13 per unit time (STEP S4). In this way, the instantaneous status determined by the basic determinator 16 is illustrated as the status table in FIG. 4A.

Next, in the definite determinator 18, the final determination of the status is performed based on the number of each of the instantaneous statuses determined in the definite time. That is, among the instantaneous statuses determined in the definite time set in advance (for example, unit time×10), if the number of any statuses, "adult", "CRS" or "empty seat" is equal to or more than the predetermined number (for example seven or more), the weight of the occupant is finally determined as any of that status, the "adult", the "CRS", or the "empty seat" (STEP S5).

Then, based on the definite status, a deployment of an air bag is controlled (STEP S6). For example, if the occupant is an "adult", the deployment of the air bag is permitted. In a case where the occupant is a "CRS", that is, an infant seated on a child seat, the deployment of the air bag is prohibited for the occupant protection and in a case of the "empty seat" where there is no occupant, and the deployment of the air bag is prohibited for preventing the waste.

In a case where the "adult" is divided into "adult" and "child" by a weight of new threshold value, a deployment speed of the air bag may be controlled in such a manner that, in a case where the occupant is an "adult", the speed is high, and the occupant is a "child", the speed is low. In this case, the optimal restraint performance can be obtained in accordance with each status.

Next, in STEP S3, in a case where the lateral acceleration is larger than the threshold value, as illustrated in FIGS. 3 and 4A, since the time lag is found to occur in the measurement weight corresponding to the change of the lateral acceleration, the determination result of the instantaneous status per unit time performed by the basic determinator 16 corresponding to the measurement weight is continuously invalidated (cancelled) during the predetermined time (STEP S7).

The predetermined time is set to an appropriate time by an experiment or the like. However, basically, the predetermined time is not the time of time lag (for example, one second) but lasts until the lateral acceleration becomes equal to or smaller than the threshold value. In this case, since the turning of the vehicle in the right and left direction or the accelerated or decelerated traveling does not continue for a long time, there is no problem in continuing the invalidation of the determination of the status until the traveling is stabilized. If the determination of the instantaneous status corresponding to the unit time restarts to perform after the time lag, since the determination of the instantaneous status is performed at the stage where the lateral acceleration exceeds the threshold value, there occurs a problem in that a risk of an erroneous determination remains.

Then, in the definite determinator 18, the process returns to STEP S5 such that the final status is determined according to the number of instantaneous statuses in the definite time retroactive to previous time excluding the time of invalidation without including the duration in which the determination of the instantaneous status is invalidated into the definite time for determining the final status.

Figure 4B:
FIG. 4B is a status table (a table that illustrates a determination result of the status corresponding to a case where the acceleration data exceeds the threshold value in the present embodiment) that illustrates a determination result when one status is selected from three statuses that correspond to the changes of the measurement weight and the lateral acceleration illustrated in FIG. 3.

On the other hand, in a case (STEP S8) where the lateral acceleration becomes equal to or smaller than the threshold value again after the lateral acceleration becomes larger than the threshold value, the determination of the instantaneous status is invalidated during the time lag (for example, one second) (STEP S9). Then after passing the time of time lag, the determination of the instantaneous status corresponding to the unit time in the basic determinator 16 is restarted (STEP S10). Then, based on the number of instantaneous statuses in the definite time retroactive to the previous time from the unit time of the instantaneous status which was determined by restarting, the final status is determined by the definite determinator 18. At that time, as illustrated in FIG. 4B, the determination is performed without including the duration (determination line G1 to determination line W2) in which the determination of the instantaneous status is invalidated into the definite time. In this way, it is possible to remove the possibility of the erroneous determination in the determination of the status of the occupant in a case where the lateral acceleration shows a change of exceeding the threshold value.

Next, a specific example of the method of determining the status by the determinator 15 described above will be described with reference to FIG. 3 and FIGS. 4A and 4B.

When the lateral acceleration (lateral G) determined by the threshold value determinator 14 is equal to or smaller than the threshold value –0.1 G in FIG. 3, then it is indicated as "0" in the table of lateral G in FIG. 4A, and when lateral G is larger than the threshold value –0.1 G (indicated by a determination line G1), then, it is indicated as "1".

On the other hand, in the basic determinator 16, the summed value of the measurement weight measured by the load sensors 3 illustrated in FIG. 3 is larger than the threshold value 15 kg, and the instantaneous status corresponding to the unit time is determined to be "adult" and is indicated as "1" and the other statuses, the "CRS" and the "empty seat" are determined to be "0" as illustrated in FIG. 4A.

After passing one second of time lag, when the measurement weight becomes smaller than the threshold value 15 kg (indicated by the determination line W1), the instantaneous status of the measurement weight is determined to be "CRS" and indicated as "1" and the "adult" and the "empty seat" are indicated as "0" in the status table in FIG. 4A.

Next, when the lateral acceleration exceeds the threshold value –0.1 G (indicated in determination line G2), the lateral G becomes "0". Then, since the measurement weight exceeds the threshold value 15 kg after passing one second of time lag (indicated in determination line W2), the instantaneous status is determined to be "adult" and indicated as "1", and other statuses "CRS" and the "empty seat" are determined to be "0".

For this reason, in the processing by the determinator 15, beyond the determination line G1 where the lateral acceleration exceeds the threshold value –0.1 G as illustrated in FIG. 4B, the determination of the instantaneous status corresponding to the unit time of the measurement weight is invalidated, and any of the instantaneous status per each unit time; the "adult", the "CRS", and the "empty seat" is invalidated and indicated as "0".

Then, after passing the predetermined time of the lateral acceleration and the time lag between the lateral acceleration and the measurement weight, that is, beyond the determination line W2 where the measurement weight exceeds and becomes larger than the threshold value 15 kg, the invalidation of the determination of the instantaneous status is stopped, and the determination of the instantaneous status per each unit time is restarted. That is, the instantaneous status is determined to be the "adult" and indicated as "1", and the "CRS" and the "empty seat" is determined to be "0".

For this reason, in the determination of the final status by the definite determinator 18, during the time from determination line G1 to determination line W2, by making the instantaneous status per each unit time as there is no regions where any of the "adult", the "CRS", and the "empty seat" are invalidated and indicated as "0", the "adult" in which the number of instantaneous statuses is equal to or more than the predetermined number in the definite time is determined to be the final status.

As described above, according to the occupant determination apparatus 1 in the present embodiment, in the range where the lateral acceleration and the measurement weight do not exceed each of the threshold values, the final status in which the number of instantaneous statuses determined in the definite time is equal to or more than the predetermined number set in advance, is determined, and in a case where the lateral acceleration exceeds the threshold value, by invalidating and excluding the instantaneous status determined in the duration of erroneous determination, it is possible to perform the highly accurate occupant determination with removing the erroneous determination of the final status.

Furthermore, after the lateral acceleration becomes larger than the threshold value, and even returns to the value equal to or smaller than the threshold value, since the instantaneous status determined during the time lag in which the measurement weight returns to the value larger than the threshold value is not used as the final status, it is possible to perform further highly accurate determination with removing the erroneous determination.

The occupant determination apparatus in the present invention is not limited to the embodiment described above, and a variety of modifications and substitutions can be made as long as there is no departure from the scope of the invention.

For example, in the occupant determination apparatus 1 in the embodiment described above, the weight is measured by installing two load sensors 3 on the left side of the seat 2. However, the load sensor may be installed on the right side, or on the position in the front and back direction. The number of load sensors 3 is not limited to two, but may be three, four or more, or there may be no limitation in number. In the embodiment described above, the instantaneous status is determined based on the summed value of the measurement weight measured by two load sensors 3, but the average value may be used instead of the summed value.

The unit time for setting the instantaneous status is determined to be 0.5 second, but it can be set appropriately. The definite time can be set to an appropriate length if the definite time is longer than the unit time.

Regarding the measurement weight, by setting a threshold value between the "adult" and the "child", the types of the status may be determined by the occupant in four types including the "CRS" and the "empty seat" by the load. Alternatively, the status may be determined in four or more statuses.

Each embodiment described above, the determination result of the instantaneous status per each unit time is invalidated by cancelling and is indicated as "0" at the stage when the acceleration becomes larger than the threshold value, and after then, during the time lag when the acceleration becomes equal to or smaller than the threshold value. However, instead of that, the instantaneous status may be indicated as "0" by stopping the determination, and such determination stop may be included in the invalidation.

What is claimed is:

1. An occupant determination apparatus comprising:
   a load sensor that measures a weight of an occupant seated on a seat of a vehicle as a measurement weight; and
   a determinator determining the weight of the occupant as one status among a plurality of statuses which are set corresponding to the weight based on the measurement weight measured by the load sensor,
   wherein the determinator:
   determines the weight of the occupant as an instantaneous status among the plurality of statuses, based on the measurement weight measured for each unit time;
   invalidates a determination result of the instantaneous status when an acceleration acting on the vehicle exceeds a threshold acceleration set in advance; and
   continues to invalidate the determination result of the instantaneous status for each unit time during a predetermined time after the acceleration acting on the vehicle changes from exceeding the threshold acceleration set in advance to not exceeding the threshold acceleration set in advance.

2. The occupant determination apparatus according to claim 1,
   wherein in a definite time set so as to be longer than the unit time, when the number of determined instantaneous statuses other than the invalidated instantaneous statuses is more than a predetermined number, the determinator determines the determined instantaneous status as a final status.

* * * * *